(12) United States Patent
Elliott

(10) Patent No.: X8096
(45) Date of Patent: Mar. 19, 1834

(54) BOLTING CLOTHS, SECURING TO THE REEL

(76) Inventor: George M. Elliott

George M. Elliott, of Hagerstown, Maryland

Letters Patent.

The Schedule referred to in these Letters Patent & making part of the same, containing a description in the words of the said George M Elliott himself of his improvement in the manner of attaching and securing bolting cloths for flour-mills to the reel or frames which support them.

Be it known that I George M. Elliot of Hagerstown in the County of Washington and State of Maryland have invented a new & useful improvement in the manner of attaching & securing bolting cloths for flour-mills to the reels or frames which sustain them the intention of which improvement is to enable the Miller or other person to attach and remove the said bolting cloth from the said reel with ease, safety & dispatch & to cleanse both cloth & reel from worms, bugs or any other insect or any other obnoxious thing that may find their way into the reel & injure the cloth & also enable the Miller or any other person to reattach said cloth to said reel with the same facility with which he removes it.

The means by which the aforesaid operation is effected is as follows, viz, the reel is made in the common form except that one set of the arms passing thro the shaft is left longer than in the common reel so as to project outside of the ribs on both sides from two to three inches; on one end of the arms thus projecting is to be secured an external rib which rib shall have mortises third it thro which the ends of the arms shall pass & the rib is to be secured by small pins passing thro the ribs & arms; on the opposite ends of the aforesaid long arms diametrically opposite the external rib aforesaid is to be placed two other external ribs which shall be notched notched so as to receive the ends of the long arms & permit
the sides of the two ribs to come into close contact; these
two ribs are to be secured to the reel by small screw bolts
passing thro them & the ends of the arms the cloth is nail
=ed to the first described external rib the seam where
the two breadths of cloth are united passing along the
centre of the ribs, which said seam should be strengthen=
ed by a strip of linen being sewed to the two edges of
the cloth the other two edges of the cloth edged with lin=
=en from two to three inches broad & nailed to the two
ribs; the cloth is then put on the reel & the two ribs closed
by the screw bolts passing thro them which draws them
close together and stretches the cloth on the reel, with the
proper degree of tention the ends of the cloth are edged with
linen as in the common way in which linen; or eyelit
or button holes are wrought at both ends, which holes are
passed over the heads of common wood screws inserted
in the head & tail pieces of the reel which screws serve
the purpose of buttons by their heads retaining their
hold on the holes in the linen. when the Miller wish=
es to take off the cloth, he will proceed to take out the screw
bolts which unite the two external ribs together after which
he will release the ends from the screw by unbuttoning
them & thus unfold the cloth from the reel; by a Vice
Varsa proceeding he can put it on again. —

The parts of which I claim as entirely & original
and for which I ask a Patent is the principle of affixing
the cloth to the reel so that it can be taken off & replaced
with celerity & safety, Witnesses
Geo. W Post
Wm. Schnebly George M Elliott

[illegible]

[illegible]